United States Patent [19]

Rita

[11] Patent Number: 4,478,947
[45] Date of Patent: Oct. 23, 1984

[54] GAS PANEL SEAL GLASS

[75] Inventor: Robert A. Rita, Lake Katrine, N.Y.

[73] Assignee: International Business Machines Corporation, Armonk, N.Y.

[21] Appl. No.: 505,025

[22] Filed: Jun. 21, 1983

Related U.S. Application Data

[63] Continuation of Ser. No. 174,058, Jul. 31, 1980, abandoned.

[51] Int. Cl.$^3$ ............................................. C03C 3/12
[52] U.S. Cl. ......................................... 501/15; 501/32
[58] Field of Search ................................ 501/15, 32

[56] References Cited

U.S. PATENT DOCUMENTS

| | | | |
|---|---|---|---|
| 1,607,817 | 11/1926 | Dennis | 106/53 |
| 3,250,631 | 5/1966 | Lusher | 106/39.6 |
| 3,907,585 | 9/1975 | Francel et al. | 106/47 R |
| 3,951,669 | 4/1976 | Malmendier et al. | 106/47 R |
| 3,954,486 | 5/1976 | Francel et al. | 106/47 R |
| 4,006,028 | 2/1977 | Nofziger | 106/47 R |
| 4,115,132 | 9/1978 | Suzuki et al. | 501/15 |
| 4,186,023 | 1/1980 | Damesmil et al. | 106/53 |
| 4,310,357 | 1/1982 | Matsuura et al. | 501/15 |

FOREIGN PATENT DOCUMENTS 3002353  7/1980  Fed. Rep. of Germany ........ 501/15

OTHER PUBLICATIONS

Takamori, T., "Solder Glasses", Treatise on Material Science & Technology, vol. 17, pp. 233–236, Academic Press, 1979.

*Primary Examiner*—Mark Bell
*Attorney, Agent, or Firm*—Sughrue, Mion, Zinn, Macpeak, and Seas

[57] ABSTRACT

A non-crystallizing sealing glass composition is described consisting essentially of from about 75.50 to 84.00 wt. % lead oxide, from about 11.25 to 14.25 wt. % boron oxide, an additional component selected from the group consisting of up to 3.10 wt. % zinc oxide and up to 9.33 wt. % bismuth oxide; other compositions could include up to 0.88 wt. % tin oxide, and up to 1.51 wt. % germainium oxide. The glass compositions include $\beta$-eucryptite in an amount sufficient to provide a coefficient of expansion of about 83.5 to $71.5 \times 10^{-7}$ C.$^{-1}$ (about 13.5 to 17.0 wt %); the glass is particularly useful in sealing a gas panel.

7 Claims, No Drawings

GAS PANEL SEAL GLASS

This application is a continuation of application Ser. No. 174,058, filed July 31, 1980, now abandoned.

BACKGROUND OF THE INVENTION

This invention relates to compositions and methods for forming glass seals.

The use of special glass compositions for sealing (sometimes referred to as "soldering") glasses or other related materials, such as ceramics, together is well known. Such glasses of the vitreous type were known to have drawbacks, in that they were often insufficiently strong to withstand the rigors of use, primarily due to the fact that such glasses often have coefficients of thermal expansion much higher than those of the glasses which they are expected to bond together; therefore, upon cooling after heat-sealing, undue stresses may be set up in the glasses, which weakens the seal.

In order to overcome some of the problems associated with vitreous solder glasses, solder glasses were developed having the property of being initially vitreous but of crystallizing (devitrifying) during heat-sealing. Such devitrification or crystallization tends to strengthen the seal structure and lower the coefficient of expansion of the seal.

In addition to the lead oxide, zinc oxide, boron oxide, and other oxides which typically constitute such devitrifiable solder glasses, U.S. Pat. No. 3,258,350, issued June 28, 1966, and U.S. Pat. No. 3,250,631, issued May 10, 1966, describe the addition of other components, such as zircon or β-eucryptite, respectively, in order to better overcome the problem of the coefficient of expansion being higher for the soldering glass than for the materials being joined together.

U.S. Pat. No. 3,778,242 issued Dec. 11, 1973, describes devitrifiable solder glass compositions having favorable properties with respect to the time and temperature factors necessary to forming a seal, and achieves this by utilizing a composition comprising an uncrystallized (vitreous) but crystallizable (devitrifiable) solder glass modified with a refractory material and a pre-crystallized glass.

U.S. Pat. No. 3,954,486, issued May 4, 1976 relates to another modification in sealing glass compositions and methods of using the same, wherein it is stated that improved results could be obtained if the particle size diameter of the refractory filler is in excess of 37 microns and not substantially in excess of 150 microns which is significantly different than in the present invention. The glass of Example 4 of this patent appears similar in composition in some respects to some of the glasses described below, but that glass has been melted in our laboratory and found to be a divitrifying glass, quite different in behavior from the glasses of the present invention. In contrast, the glasses of the present invention are not devitifying compositions that do not contain alkaline oxides and generally do not contain silica, both of which tend to encourage devitrification. U.S. Pat. No. 4,006,028, issued Feb. 1, 1977, discloses a devitrifying sealing glass using a finer β-eucryptite which is still much coarser than that used in the present invention.

U.S. Pat. No. 3,907,585, issued Sept. 23, 1975 describes certain problems that occur using devitrifiable glass and inert refractory particles as described above, and although noting that non-crystallizing glass solders mixed with refractory substances were, upon the basis of preliminary experiments, thought useful to circumvent such problems, states that additional experiments have established that mixtures of noncrystallizing glass solders having a low softening point and β-eucryptite or similar substances are normally unsuitable from a technical standpoint (e.g., because intolerably high mechanical stresses develop between the mixture components). To solve such problems, U.S. Pat. No. 3,907,535 describes a process for soldering using a thermally devitrifiable solder glass and β-eucryptite, wherein the soldering is discontinued before 50% of the total volume of the composition crystallizes. The examples describe soldering operations for such compositions at 450° C. and 550° C., with the specification generally referring to a range of up to 450° C.–600° C.

Another problem that has been assumed to exist with respect to such mixed phase seal-glasses is that they cannot undergo a redraw process; however, IBM Technical Disclosure Bulletin Volume 20, No. 7, December, 1977, indicates that mixed phase seal-glasses can be redrawn with an appropriate choice of redraw temperature. The seal material used by Diel is believed to have been a mixture of β-eucryptite and a glass which unlike the materials claimed herein is a devitrifying glass.

U.S. Pat. No. 3,734,702, issued May 22, 1973, describes a crystallizable fusion-type glass sealing composition in which aluminum titanate is incorporated in a lead borosilicate or lead-zinc-borate solder glass, in order to inhibit crystallization, thus providing more time for forming a seal without developing uneven stress concentrations due to crystallization.

Because of limitations inherent in the properties of certain materials which it may be desired to seal, the devitrifiable solder glasses discussed above may be additionally unsatisfactory due to the fact that the high temperatures associated with the devitrified nature of the solder glasses may result in deterioration of the materials being sealed. For example, in the construction of gas panel displays, a dielectric glass is formed over conductors on a plate glass substrate, followed by application of a magnesium oxide coating over the dielectric, and finally by sealing at a temperature of about 485°–490° C. However, due to the fact that there is a maximum temperature-time combination to which the dielectric can be exposed during sealing, and the fact that magnesium-oxide crazing occurs at temperatures of approximately 495° C., a continuing need for improved sealing glass compositions exist. Desirably, such sealing glass compositions could be used for sealing at temperatures less than 450° C. and would have coefficients of thermal expansion and mechanical properties corresponding to those of the materials being sealed.

SUMMARY OF THE INVENTION

The present invention relates to a non-crystallizing sealing glass composition, capable of forming a seal at about 425° C., consisting essentially of about 75.50 to 84.00 wt. % lead oxide (PbO), from about 11.25 to 14.25 wt. % boron oxide ($B_2O_3$), an additional components selected from the group consisting of up to 3.10 wt. % zinc oxide (ZnO), and up to 9.33 wt. % bismuth oxide ($Bi_2O_3$), and β-eucryptite in an amount sufficient to provide a coefficient of expansion of about 83.5 to $71.5 \times 10^{-7}$ °C.$^{-1}$ (about 13.5 to 17.0 wt. %). Other compositions can include up to 0.88 wt. % tin oxide ($SnO_2$), and up to 1.51 wt. % germanium oxide ($GeO_2$).

The present invention also relates to a process for forming a glass seal using such compositions.

DETAILED DESCRIPTION OF THE INVENTION

A sealing glass composition according to the present invention, consisting essentially of a particular non-crystallizing glass material and β-eucryptite material having a coefficient of thermal expansion as described results in a favorable combination of properties, viz., the composition is non-crystallizing, capable of forming a seal at a temperature of about 425° C., and results in seals having good mechanical strength.

By "non-crystallizing" is meant that little or no devitrification or crystallization, occurs when the sealing glass composition is heated and reheated. This results in the additional favorable property not possessed by typical devitrifiable solder glasses that the instant composition can be shaped into a desired configuration, fused to form a billet, and redrawn into rods for use, e.g., in the formation of gas panel perimeter seals. It is extremely difficult to regularly prepare suitable billets with typical devitrifiable soldering glasses since cracks can form which do not heal during billet fusion when thermal cycles such as those described herein are utilized. Further, when rods are redrawn from those billets that can be successfully prepared, the cross-section can not always be uniformly controlled and the surfaces can be bumpy. These effects are believed to result from crystals which developed from the originally glassy phase during billet preparation, the presence of large size expansion modifier particles, or both. Additionally, due to its devitrifying nature, ring preforms utilized for sealing the gas inlet tubulation to the float glass substrate in a gas panel required minimum sealing temperatures of about 445° C. (1 hour soak) in order to suitably wet the tube and substrate glasses and form acceptable fillets. Preforms prepared from materials described herein acceptably flow and form suitable fillets at temperatures as low as 410° C.

each in the amounts indicated. In preferred embodiments, the ZnO is present in an amount from about 1.80 to 2.90 wt. %. Similarly, $Bi_2O_3$ is preferably present in an amount from 2.6 to 9.4 wt. %, $SnO_2$ in an amount from 0 to 0.9 wt. %, and the $GeO_2$ is present in amount from 0 to 1.5 wt. %. In contrast to conventional solder glasses of a devitrifying nature, the glass material of the present invention does not contain an alkaline oxide such as BaO or $Al_2O_3$ and CuO, and in most cases it does not contain $SiO_2$.

Glasses having compositions listed in Table 1 have the combined qualities of a relatively low softening temperature and being essentially free of crystallization. Generally, the powdered glasses alone are not completely stable in that although no crystallization is detectable by X-ray defraction or DTA (differential thermal analysis) techniques, a few isolated crystals can be detected optically in the approximate temperature interval of 390°-460° C. Glasses G and H are stable under the conditions given above, i.e., no crystals are detected. When the glasses in Table 1 are combined with β-eucryptite, not only are no crystals detected by DTA and X-ray techniques, but microscopic observation of both free surfaces and polished sections does not reveal any crystal development from the glass phase.

The relatively small amount of ZnO and/or $Bi_2O_3$ is believed the primary reason the glasses do not devitrify. When neither is present, or when the concentrations exceed the specified limits, undesirable crystallization results. The addition of $SnO_2$ and/or $GeO_2$ allows some flexibility in the concentrations of the other components to lower the softening temperature without introducing undesirable crystallization, but the ZnO and/or $Bi_2O_3$ are preferably present.

For some compositions, as much as 1.5 weight % $SiO_2$ can be added, but generally it tends to induce crystallization and, as a rule, is omitted. Decreasing the $B_2O_3$ content significantly (e.g. 1–2%) will result in crystallization and increasing the concentration undesirably increases the softening temperature.

TABLE 1

| SAMPLE | A | B | C | D | E | F | G | H | I | J | K | L |
| --- | --- | --- | --- | --- | --- | --- | --- | --- | --- | --- | --- | --- |
| PbO | 84.00 | 84.00 | 82.78 | 84.00 | 80.96 | 84.00 | 79.03 | 75.49 | 78.60 | 81.68 | 79.11 | 81.83 |
| ZnO | 2.00 | 2.00 | 2.99 | — | — | 1.00 | 1.90 | 1.86 | 3.10 | 1.91 | 2.81 | 1.88 |
| $Bi_2O_3$ | — | — | — | 2.00 | 5.32 | 1.00 | 5.45 | 9.33 | 5.47 | 2.73 | 5.37 | 2.69 |
| $SnO_2$ | — | — | — | — | — | — | — | — | — | 0.88 | 0.87 | 0.87 |
| $B_2O_3$ | 12.50 | 14.00 | 14.23 | 14.00 | 13.72 | 14.00 | 13.61 | 13.31 | 12.83 | 12.80 | 11.84 | 11.22 |
| $GeO_2$ | — | — | — | — | — | — | — | — | — | — | — | 1.51 |
| $SiO_2$ | 1.50 | — | — | — | — | — | — | — | — | — | — | — |
| $Bi_2O_3$ + ZnO | 2.00 | 2.00 | 2.99 | 2.00 | 5.32 | 2.00 | 7.35 | 11.19 | 8.57 | 4.64 | 8.18 | 4.57 |
| $GeO_2$ + $SiO_2$ | 1.50 | — | — | — | — | — | — | — | — | — | — | 1.51 |
| Glassy Edge (°C.) (1) | 355 | 350 | 357 | 350 | 350 | 355 | 355 | 355 | 350 | 350 | 345 | 342 |
| Tg (DTA) | | 334 | | | | | 335 | | | | 329 | 328 |
| $\alpha(\times 10^7 °C.^{-1})$ | | 124 | | | | | 120 | | | | 126 | 128 |
| Fiber Softening Temp. (°C.) | | | | | | | | | | | | 344 |

(1): In evaluating glass compositions, a gradient furnace test was used whereby a powdered glass layer containing no expansion modifier was applied to a float glass substrate heated at 5° C./min and allowed to soak for 1 hour with the temperature varying in a controlled manner from one end of the sample to the other. When the sample is cooled, a rather sharply defined line is observed corresponding to a temperature below which the powder is essential unfused and opaque, and above which the powder has fused into a vitreous mass. Under the particular conditions utilized, the temperature of this "glassy edge" closely approximates the fiber softening temperature of the glass relative flowability. Further, the extent of crystallization at any temperature above the glassy edge can be readily observed.

The glass material component of the sealing glass composition is a non-crystallizing material consisting essentially of from about 75.50 to 84.00 wt. % PbO, from about 11.25 to 14.25 wt. % $B_2O_3$, and (a) up to 3.10 wt. % ZnO and/or (b) up to 9.33 wt. % $Bi_2O_3$. Other compositions may also contain (c) up to 1.00 wt. % $SnO_2$ and/or (d) up to 1.51 wt. % $GeO_2$. Also, combinations of the ZnO, $Bi_2O_3$, $SnO_2$, and $GeO_2$ may be used, β-eucryptite has the essential characteristic of having a negative coefficient of thermal expansion and is used in an amount sufficient to establish expansion compatibility with the soda-lime-silica (float) glass substrates, the high-lead dielectric glass and the tubulation glass typically forming a gas display panel. To this end, the sealing glass containing β-eucryptite has an expansion coefficient (300° C.-RT) of about 83.5 to 71.5×10$^{-7}$° C.$^{-1}$ and contains about 13.5 to 17.0 wt. % β-eucryptite. In embodiments preferred from the combined aspects of flow and expansion, the β-eucryptite is present in an amount from about 14.5 to 16.5 wt. %.

Additionally, it is preferred to limit the size and concentration of large β-eucryptite particles in preparing rod preforms utilized in gas panel perimeter seals. It has been found that the seal configuration as well as the physical form and behavior of the perimeter seal can be enhanced by limiting the maximum size of the particles to less than the desired panel gap and preferably to a size much smaller than the desired gap. When the gas panel assembly is heated to the sealing temperature, the glassy phase of the seal material softens and begins to flow. As the seal broadens and is compressed, the rigid β-eucryptite particles are displaced by the adjacent flowing glass and are dispersed throughout the seal. However, the forces acting upon the β-eucryptite particles are apparently not uniform and large particles have a tendency to concentrate in localized regions having a lower capacity to flow than in adjacent regions deficient in larger particles. Depending upon the ultimate gap attained, the sealing rod dimensions, as well as the size and amount of large particles, this can result in a seal of varying width and a ragged seal parimeter. Regions of minimum seal width (containing concentrated large particles) are potentially undesirable stress concentrators and the localized inhomogeneity may result in different and possibly undesirable thermo-mechanical properties relative to a more uniform material. Further, when a relatively large quantity of larger β-eucryptite particles is used in preparing the sealing powder the redrawn rod preforms have bumpy surfaces containing protuberances associated with large particles just under the rod surface. The rough surface can make measurement and dimensional control of the rod difficult, render the rod more susceptible to displacement after positioning during panel construction, and increase the probability that fragments will chip off the rods during or after assembly of the panel. Chips landing in the electrically active area of the panel will degrade the properties of the secondary emissive (MgO layer) and hence the electrical operation of the panel in that area. A specific example that demonstrates the enhanced behavior when the modifier particle size is controlled is described below.

REFERENCE EXAMPLE

A glass having a composition (unless otherwise indicated all percents are by weight) of 81.8% PbO, 1.9% ZnO, 2.7% Bi$_2$O$_3$, 0.9% SnO$_2$, 11.2% B$_2$O$_3$, and 1.5% GeO$_2$ is powdered and combined with powdered β-eucryptite (14.5% of mixture) having the particle size distribution of Example A in Table 2 below. For comparison the same glass powder is combined with powdered β-eucryptite having the particle size distribution B shown in Table 2 below.

TABLE 2

| CUMMULATIVE MASS (% FINER) | EQUIVALENT SPHERICAL DIAMETER (MICRONS) | |
|---|---|---|
| | A | B |
| 100% | 70 | 30 |
| 95% | 40 | 19 |
| 90% | 32 | 15 |
| 80% | 22 | 10 |
| 70% | 15 | 7.2 |
| 60% | 8.7 | 6.0 |
| 50% | 6.3 | 5.0 |
| 40% | 4.7 | 4.0 |
| 30% | 3.6 | 3.2 |
| 20% | 2.3 | 2.4 |
| 10% | 1.2 | 1.4 |

In the case of β-eucryptite A, the resultant rods are rough and contain projections, and the seals produced when construction panels have a nominal 4 mil gap have ragged perimeters. On the other hand, in the case of β-eucryptite B, the rod surfaces are smooth, the resultant seal widths are uniform, and the seal perimeter is smooth. Furthermore, the difference in the particle size distributions does not seem to significantly affect the seal preform's ability to flow.

The β-eucryptite used in the present invention should have a maximum particle size less than 100μ and preferably less than 30μ. Moreover, in terms of particle size distribution, preferably at least 90% of the modifier has a particle size less than or equal to 15μ and more preferably at least 90% has a particle size less than 10μ.

In the method of the invention the non-crystallizing sealing glass composition is applied to the glass (or related material) work piece, and is heated to a temperature of about 425° C. until thermal fusing occurs. A typical heat up rate can vary from 5° C. to 7.5° C. per minute. The sealing glass composition may be applied either in the form of a powder, or conveniently from a previously formed fillet. Preparation of a gas display panel structure, wherein a sealing glass composition according to the present invention may be used, is described, for example, in U.S. Pat. Nos. 3,499,167 and 3,559,190, and in an article by D. L. Bitzer and H. G. Slottow entitled "The Plasma Display Panel—Digitally Addressable Display With Inherent Memory", Proceedings of the Fall Joint Computer Conference, IEEE, November, 1966 pp. 541-547, hereby incorporated by reference.

While the sealing glass of the present invention can be combined with an organic liquid vehicle and the fluid mixture applied using techniques such as spraying, screen printing, extrusion, etc., it is preferred to form solid preforms which can facilitate the assembly process and minimize or eliminate exposure of the electrically active area to organic contaminants that may degrade panel operation. The preferred preform for the perimeter seal is a rod of rectangular cross-section and appropriate length and for the tube seal is a cylinder that can encircle the gas tubulation at the base where it contacts the substrate glass.

To prepare the rod preform the blended powder is pressed into a bar shape without the addition of accessory organics and is fused into a billet by heating-up at about 6° C./min to 400°-415° C. and holding the material at the temperature for about 20-30 minutes. After cooling the billet surfaces are finished and rods are redrawn using a procedure analogous to that used to redraw conventional vitreous glasses. The redraw temperature is intermediate the softening point of the glass phase (about 344° C.) and the ultimate seal temperature (about 425° C.) but closer to the latter. Thus, in order to prepare the rods the material is exposed twice to temperatures 45°-70° C. above the base glass softening temperature, and must still be able to flow (and at relatively low temperatures) when reheated during the sealing operation. For this reason it is important that the glass component be of the non-crystallizing type since most of the low temperature lead borate solder glasses will crystallize during the above thermal cycles and will not have adequate flow to form suitable seals, if the preforms can even be fabricated.

The ring preforms are prepared using conventional ceramic powder pressing procedures and sintered about 5°–45° C. above the fiber softening temperature of the glass phase. This procedure can be utilized with devitrifying solder glasses although the seal materials described here offer greater processing latitude and generally lower seal temperatures.

The present invention will be illustrated in more detail by the following non-liiting Examples unless otherwise indicated all percents are by weight.

EXAMPLE 1

Glasses B, G, and L were each combined with $\beta$-eucryptite modifier, with the latter comprising 14.5 weight % of the total mixture. Seal rod and seal ring preforms were prepared from the mixtures and test samples were sealed using procedures designed to simulate gas panel construction. Adequate flow was achieved for the rod preforms after one hour at 425°–430° C. using a 5° C./min heating rate, and after one hour at 410°–415° C. for the seal rings, again using a 5° C./min heating rate. The seal temperature for the blend prepared using glass L was in both cases about 5° C. lower than for blends based upon the other two glasses as would be expected from the Tg and glassy edge data. Standard photoelastic stress analysis samples (Hagy & Smith, *J. Can. Cer. Soc,* vol 38 p. 63, 1969) were prepared using seal materials prepared using $\beta$-eucryptite (14.5 wt.%) and glasses B, G, and L. The expansion mismatch found by this technique was 118, 122, and 102 PPM respectively (float glass in compression), which is more than adequate. The expansion coefficients for mixtures based on glasses B and L (300° C.-RT) were $79.4 \times 10^{-7}$ and $81.2 \times 10^{-7}$ C.$^{-1}$ respectively.

EXAMPLE 2

Hermetic gas panels were fabricated according to the above thermal cycle using seal preforms prepared from powdered blends comprised of 14.5 wt. % $\beta$-eucryptite and glasses B and L. The electrical characteristics were at least as good as panels constructed with conventional (prior art) vitreous or devitrifying solder glasses. Such panels have been subjected to a burst test in which the panel interior is uniformly pressurized by introducing gas through the inlet tube until the panel fractures. An overly weak seal would result in a low break pressure since fracture usually originates in the seal. The burst pressures for the $\beta$-eucryptite containing vitreous glasses were found to be the same as for similar panels sealed with either devitrifying solder glasses or conventional vitreous solder glasses.

EXAMPLE 3

Ultimate seal strength was evaluated by measuring the modulus of rupture (MOR) (3-point loading-beam sample) of a glass B plus $\beta$-eucryptite mixture (14.5%), glass B alone, a typical vitreous seal glass, and a typical devitrifying solder glass. All samples were prepared using identical procedures and fused at temperatures representative of their respective seal cycles. The results are given below:

| Material | MOR (psi) |
| --- | --- |
| Vitreous Solder Glass | 4,850 |
| Glass B | 4,950 |
| Glass B $\beta$-eucryptite | 7,330 |
| Devit. Solder Glass (Corning 7575) | 7,300 |

As can be seen the glass B-$\beta$eucryptite mixture has a strength closely approximating the strength of a typical devitrifying solder glass. The latter is generally considered to be among the stronger materials available for these seal applications.

Although the foregoing description describes detailed features of preferred embodiments of the invention, it is understood that various changes and modifications in the foregoing details can be made without departing from the spirit and scope of the present invention.

What is claimed is:

1. A non-crystallizing sealing glass composition, capable of forming a seal at about 425° C., consisting essentially of from about 75.50 to 84.00 wt. % PbO, from about 11.24 to 14.25 wt. % $B_2O_3$, 1.80 to 2.90 wt. % ZnO, and 2.6 to 9.4 wt. % $Bi_2O_3$, and $\beta$-eucryptite in an amount sufficient to provide a coefficient of expansion of about 83.5 to $71.5 \times 10^{-7}$ C.$^{-1}$, said $\beta$-eucryptite used in the formulation of said non-crystallizing sealing glass composition being a powder having a maximum particle size less than 30 microns, said sealing glass composition being non-crystallizing in that essentially no crystallization occurs when the glass composition without the $\beta$-eucryptite is applied to a float glass substrate heated at about 5° C./minute until thermal fusing of the glass composition occurs, allowed to soak for 1 hour, and then allowed to cool, said sealing glass composition with the $\beta$-eucryptite having a glassy edge temperature no higher than 357° C.

2. A non-crystallizing sealing glass composition as in claim 1 further including (c) up to 0.88 wt% of $SnO_2$ and/or (d) up to 1.51 wt% $GeO_2$.

3. A non-devitrifiable sealing glass composition as in claim 1 wherein said $\beta$-eucryptite is present in an amount from about 14.5 to 16.5 percent by weight.

4. A non-crystallizing sealing glass composition as in claim 1 wherein approximately 90% of said $\beta$-eucryptite has a maximum particle size equal to less than 15 microns.

5. A non-crystallizing sealing glass composition as in claim 2, wherein the glass contains $SnO_2$.

6. A non-crystallizing sealing glass composition as in claim 2, wherein the glass contains $GeO_2$.

7. A non-crystallizing sealing glass composition as in claim 1 wherein said glassy edge temperature is 342°–345° C.

* * * * *